United States Patent [19]

Dei Rossi

[11] Patent Number: 5,154,959
[45] Date of Patent: Oct. 13, 1992

[54] PROCESS FOR THE MANUFACTURE OF A DECORATIVE PRODUCT FORMED OF GLASS BEADS AND/OR CHIPS BOUND TOGETHER BETWEEN A PAIR OF TRANSPARENT SHEETS

[75] Inventor: Vincenzo Dei Rossi, Mestre-Marghera VE, Italy

[73] Assignee: Società Italiana VTRO-SIV-S.p.A., San Salvo CH, Italy

[21] Appl. No.: 539,739

[22] Filed: Jun. 18, 1990

[30] Foreign Application Priority Data

Jun. 16, 1989 [IT] Italy .................. 48095 A/89

[51] Int. Cl.⁵ .................................. B05D 7/02
[52] U.S. Cl. ........................ 428/67; 427/520; 427/521; 427/204; 427/389.7; 427/221; 428/38; 264/128
[58] Field of Search ............... 427/201, 203, 204, 269, 427/56.1, 44, 54.1, 55, 389.7, 221; 264/128; 428/67, 38

[56] References Cited

U.S. PATENT DOCUMENTS

| | | | |
|---|---|---|---|
| 2,451,913 | 10/1948 | Brice | 428/67 |
| 3,034,945 | 5/1962 | Bush | 264/128 |
| 3,065,559 | 11/1962 | McKenzie | 428/67 |
| 3,166,615 | 1/1965 | Farrell | 264/128 |
| 3,281,515 | 10/1966 | Schmitz | 264/128 |
| 3,344,011 | 9/1967 | Goozner | 428/67 |
| 3,541,194 | 11/1970 | Resnick | 264/71 |
| 3,856,054 | 12/1974 | Steinberg et al. | 264/128 |
| 3,933,875 | 1/1976 | Brose et al. | 428/413 |
| 3,935,364 | 1/1976 | Proksch et al. | 427/44 |
| 4,036,929 | 7/1977 | Gould | 428/67 |
| 4,199,631 | 4/1980 | Cheon | 427/203 |
| 4,347,270 | 8/1982 | Hart | 428/67 |
| 4,490,410 | 12/1984 | Takiyama et al. | 427/44 |
| 4,732,717 | 3/1988 | Yanagida et al. | 264/128 |
| 4,791,022 | 12/1988 | Graham | 428/324 |
| 4,801,495 | 1/1989 | van der Hoeven | 427/44 |
| 4,927,572 | 5/1990 | van der Hoeven | 264/137 |

FOREIGN PATENT DOCUMENTS

| | | | |
|---|---|---|---|
| 62-132700A | 6/1987 | Japan | 427/201 |
| 2205678 | 12/1988 | United Kingdom | 427/201 |

Primary Examiner—Michael Lusignan
Assistant Examiner—D. L. Dudash
Attorney, Agent, or Firm—Wenderoth, Lind & Ponack

[57] ABSTRACT

A process for the manufacture of a decorative product particularly for use in the ornamental field, in which selected organic chemical compounds are employed, which are prepared and applied in a way to confer to the same product favorable safety characteristics during use.

7 Claims, No Drawings

PROCESS FOR THE MANUFACTURE OF A DECORATIVE PRODUCT FORMED OF GLASS BEADS AND/OR CHIPS BOUND TOGETHER BETWEEN A PAIR OF TRANSPARENT SHEETS

BACKGROUND OF THE INVENTION

1. Field of the Invention

The present invention refers to a process for the manufacture of a decorative product formed by a composite material, particularly suited to be used in the field of furnishing and artistic adornment, and to a decorative product obtained through such a process.

2. Description of the Prior Art

In the prior art, numerous decorative items are already known having the object of providing special luminous and aesthetic effects in the environment in which they are used and forming partitioning walls, luminous ceilings and the like.

These two-dimensional decorative items, of any shape are given the commercial term panel and this term will be used for them in the following description.

Italian patent application No. 35700B8/8 descibes a panel comprising a combination of: two transparent sheets placed at a reciprocal distance reduced relative to the size of the surface extension of said sheets; spacing and sealing members which bind said sheets and a plurality of coloured glass beads and/or glass chips and/or ground glass and/or granulated glass and/or glass dust), for filling completely or partly the volume between said two sheets.

By special arrangement of shapes and colours, said filling material provides a decorative effect to the panel, and for this reason, in the following description it will be called decorative material.

The above described type of panel, shows some drawbacks when it is used on large surfaces and in all cases in which it is necessary to ensure an adequate degree of safety associated with an aesthetic effect.

In fact, in the case of a square-shaped panel, the sides can not be more than 50 cm, in that the heavy weight of the decorative material contained would cause bending the sheets forming the container. Furthermore, in the case of breakage of one or of both the sheets of the container, a scattering and loss of the decorative material would occur. Moreover, in the case these panels should be used for decorative purposes in doors or external surfaces or walls or ceilings or skylights, it is not possible to guarantee adequate safety characteristics against their breakage.

An object of the present invention is to overcome the drawbacks mentioned above, by providing a panel which has adequate safety characteristics to be usable in a plurality of uses which were not thought of until now in the prior art.

Another object of the present invention is to propose a process for the manufacture of this new type of product.

SUMMARY OF THE INVENTION

This process comprises a step of pouring a binding chemical composition on the decorative material, which is itself incoherent.

The decorative material can be arranged either between two transparent sheets or behind a single transparent sheet.

After having carried out the pouring and having waited an appropriate length of time for degassing, the preparation is subjected to hardening according to known techniques, under a pressure included between 1 and 3 atm.

Hardening techniques which could be used favourably can comprise infrared irradiation or ultaviolet irradiation or solvent evaporation.

In this way a composite decorative material is obtained, formed by two different materials. The first consists of glass beads or glass dust or glass chips or ground glass, which is the decorative material. The other comprises the binding material which acts to hold together the glass material and, according to the type of chemical compound, provides it with an adequate degree of safety.

Representative of chemical compounds to be used are: interpenetrating polymer network compounds (known in the art with the initials IPN) based on acryl-/urethane monomers or on acrylovinyl/urethane monomers or on epoxy/urethane monomers or on methacryl-/urethane monomers or on styrene/urethane monomers; compounds based on liquid acryl or methacryl or silicone or styrene or allyl monomers or mixtures of said monomers or of their appropriately dissolved polymers thereof; compounds based on epoxy monomers; polyvinylalcohol polymers dissolved in appropriate solvents; cellulose polymers dissolved in appropriate solvents and mixtures thereof.

The advantages of the present invention consist obtaining a good resistance to breakage depending on the chemical compound used; reducing the thickness of the covering sheet or sheets thanks to the presence of the appropriately bound decorative material; and in the possibility of using non-coloured decorative materials which have a reduced cost, whereas the colour can be provided instead by the binding material.

Therefore, the object of the present invention is a process for the manufacture of a decorative product consisting of a container having at least one transparent sheet and a composite material formed of an incoherent decorative material contained in said container and by a binding composition of a polymer material which binds in a solidified form said decorative material, comprising:

forming a binding composition comprising at least one chemical substance selected from the class consisting of interpenetrating polymer network compounds based on acryl/urethane monomers, acrylovinyl/urethane monomers, epoxy/urethane monomers, methacryl/urethane monomers, or styrene/urethane monomers, compounds based on acryl or methacryl or silicone or styrene or allyl monomers or mixtures of said monomers or of dissolved polymers thereof in a solvent, compounds based on epoxy monomers, polyvinylalcohol polymers dissolved in a solvent, cellulose polymers dissolved in a solvent and mixtures thereof; pouring said composition on the decorative material to form said composite material; subjecting the composite thus obtained to a pressure from 1 to 3 atm and curing said composite by infrared and/or ultraviolet irradiation, or by solvent evaporation.

A further object of the present invention is a decorative product suitable to be used in the fields of furnishing and artistic adornment, comprising a container having at least one transparent sheet and a composite material contained in said container formed by an incoherent and decorative material and by a binding composition of polymer materials which binds in a solidified form said decorative material.

According to a modification of the present invention, the decorative material is first bound with polymer compounds, in different shapes and colours and later said material is encased between the transparent sheets.

DESCRIPTION OF THE PREFERRED EMBODIMENTS

The characteristics of the invention will be better clarified in the description of the following examples of embodiment of the invention.

EXAMPLE 1

The following mixture of interpenetrating polymers (IPN) based on vinyl-acryl-urethane monomers is prepared:

| | |
|---|---|
| 1,6 hexanediol | 72 g |
| trifunctional polycaprolactone OH number 303.5 | 72 g |
| polycaprolactone, molecular weight 2000 OH number 56.1 | 64 g |
| tetrafunctional polycaprolactone OH number 221.07 | 160 g |
| polytetrahydrofurane molecular weight 1000 | 160 g |
| silicone surfactant SILWETT 77 | 0.64 g |

The composition is degassed, dehydrated under vacuum at 100° C. for about 2 hours. After cooling, the following substances are added:

| | |
|---|---|
| NVP | 200 g |
| 2-ethylhetyl acrylate | 200.8 g |
| trimethylol propantriacrylate (TMPTA) | 40.8 g |
| catalyst (mercury salt) | 4 g |
| DBTL catalyst | 0.8 g |
| UV absorber | 1.6 g |
| azocompound catalyst | 0.7 g |

The mixture is stirred for about 30 minutes. Before use, a suitable quantity of polyadduct of IPDI is added, to obtain a stechiometric relationship between NCO and OH from 1:1 to 1:1.07.

The composite is quickly homogenised and poured on the decorative material. After waiting for about 10 minutes, the composite is subjected to a pressure from 1 to 3 atm and simultaneously heated to 90°-100° C. for about 1/1.5 hours.

In this manner a panel is obtained comprised by a transparent sheet and a composite decorative material and which has adequate safety characteristics.

EXAMPLE 2

The same composition and the same process are used as in example 1.

Differing from the latter, the liquid mixture is poured on a decorative material filling a two-dimensional container formed of two transparent sheets.

EXAMPLE 3

The same composition and the same process are used as in example 2.

Differing from example 2, the inner face of the transparent sheets of the container are treated with a release agent. After polymerisation, the two sheets are separated and a composite is obtained, formed by a binding material and by glassy decorative material which can be advantageously used as a decorative product on its own. Such a product, formed in different shapes and colours, can be rearranged in an appropriate decorative form and encased between the transparent sheets.

EXAMPLE 4

A mixture of acrylovinyl monomers is prepared, dispersed in acryl-urethane prepolymer according to the following composition:

| | |
|---|---|
| NVP | 15 g |
| 2-ethylhetyl acrylate | 20 g |
| TMPTA | 7 g |
| acryl/urethane prepolymer SYNOCURE 3135 | 10 g |
| acryl/urethane prepolymer Actilane 20 | 5 g |
| UV Daracur 1173 catalyst | 1 g |
| UV Daracur 1664 catalyst | 0.8 g |
| azocompound catalyst | 0.05 g |
| SAVINYL 2 GLS SANDOZ dye | 0.01 g |

The composition is mixed and homogenised and then poured on the decorative material. It is subsequently subjected to UV treatment for five minutes.

This binding composition can be used in the same way as described in examples 1 to 3.

I claim:

1. Process for the manufacture of a decorative product having safety characteristics consisting of a container having a pair of opposed transparent sheets and a composite material formed of an incoherent decorative material contained in said container and by a binding composition of a polymer material which binds in a solidified form said decorative material, comprising the steps of filling said container with glass beads and/or glass chips with decorative material;

forming a binding composition comprising interpenetrating polymer network compounds based on acryl-urethane monomers;

pouring said composition into said container and on the decorative material to form said composite material;

subjecting the composite thus obtained to a pressure from 1 to 3 atmospheres; and curing said composite by infrared and/or ultraviolet irradiation, or by solvent evaporation.

2. Process according to claim 1, in which said glass beads and/or glass chips in said container have a shape according to a design determined at the time of pouring the binding composition.

3. Process according to claim 1, in which prior to the pouring operation, an appropriate release agent is applied on the sheets of transparent material, to enable the decorative material bound with polymer compounds to be releasesd.

4. A process as claimed in claim 1, in which said binding composition further comprises fillers and/or dyes.

5. A process as claimed in claim 1 in which said composite is cured by infrared and/or ultraviolet irradiation.

6. A process as claimed in claim 1 in which said composite is cured by solvent evaporation.

7. A product made by the process according to claim 1.

* * * * *